S. W. BARD.
Seed-Drill.

No. 213,088. Patented Mar. 11, 1879.

Witnesses:
E. E. Masson
O. E. Dick

Inventor:
S. Weidler Bard
by E. H. Dick
his Attorney

UNITED STATES PATENT OFFICE.

S. WEIDLER BARD, OF MIDDLETOWN, PENNSYLVANIA.

IMPROVEMENT IN SEED-DRILLS.

Specification forming part of Letters Patent No. 213,088, dated March 11, 1879; application filed January 17, 1879.

*To all whom it may concern:*

Be it known that I, S. WEIDLER BARD, of Middletown, in the county of Dauphin and State of Pennsylvania, have invented certain new and useful Improvements in Seed Drills or Droppers; and that the following is a full, clear, and exact description of the same, reference being had to the accompanying drawings, in which—

Figure 1:
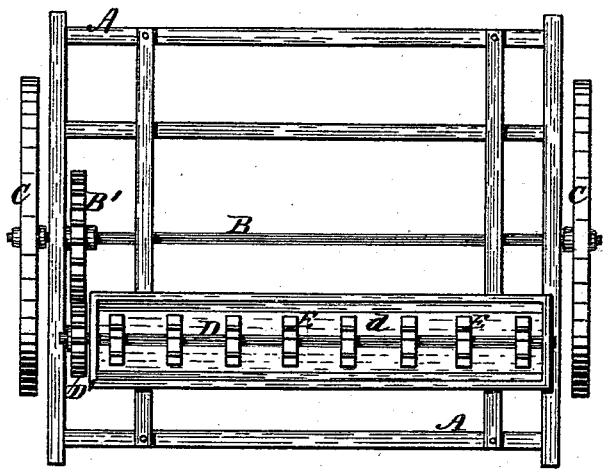
Figure 2:
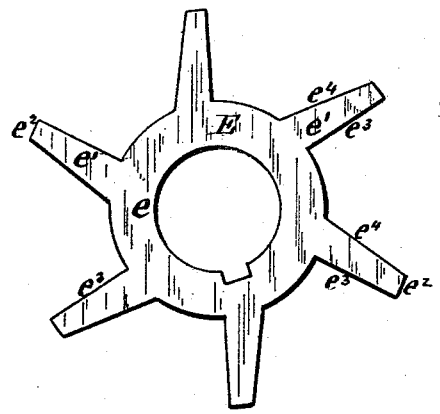

Figure 1 represents a top view of a seeding-machine having my improved seed-wheels. Fig. 2 represents a side view of one of said seed-wheels.

My invention relates, mainly, to the peculiar form of the seed-wheels and to their location in the machine.

Heretofore the seed-wheels of grain-droppers have been made either with triangular projections, having one of the sides of the triangle radial or concave, presenting an acute edge to the grain or seed, and contracted chambers for its reception or the seed, or the seed-wheels have been provided with pins, teeth, or projections, having their axis radial or passing through the center of the wheel, bringing the feeding-surfaces of the wheel at a tangent to said center, and forcing the seed to the edge of the wheel, where a portion of it becomes ground between it and the concave or seed-trough, and its vitality is thus destroyed.

The object of my invention is to remedy this defect by giving to the seed-wheel a new and better form than heretofore used.

My invention consists in the combination of a central hub keyed on a shaft with a series of teeth or spokes formed in one piece with said hub, each tooth being rectangular at its periphery, and so formed as to have its seed-advancing face in a plane passing through the center of the hub.

In the drawings, A represents the frame of the seeder. B is the axle, supported at each end by the driving-wheels C. D represents the shaft, carrying a series of seed-wheels, E, capable of being revolved in the seed-trough $d$ by a cog-wheel, D', meshing with a gear-wheel, B', attached to the axle B. All the seed-wheels are formed in one piece of a hub, $e$, and a series of teeth or spokes, $e^1$, having their periphery $e^2$ rectangular, and their seed-advancing face $e^3$ radial with the center of the wheel, to carry the seed without injuring it, and the face $e^4$ at an acute angle with the first, to brace the spokes properly.

Having now fully described my invention, I claim—

In a seeding-machine, the combination, with the shaft, of a central hub, $e$, secured on said shaft, and provided with a series of teeth or spokes, $e^1$, formed in one piece with said hub, each tooth or spoke being rectangular at its periphery, with its seed-advancing face $e^3$ in a plane passing through the center of the hub, substantially as shown, and for the purposes described.

S. WEIDLER BARD.

Witnesses:
   WM. A. CROLL,
   A. M. CROLL.